United States Patent [19]
>
> Wong et al.

[11] Patent Number: 4,710,367

[45] Date of Patent: Dec. 1, 1987

[54] PROCESS FOR REDUCING THE CONCENTRATION OF HEAVY METALS IN GEOTHERMAL BRINE SLUDGE

[75] Inventors: Morton M. Wong, Placentia; Arnold L. Shugarman, Santa Ana, both of Calif.

[73] Assignees: Union Oil Co. of California, Los Angeles; Mono Power Co., Rosemead; Southern Pacific Land Co., San Francisco, all of Calif.

[21] Appl. No.: 661,154

[22] Filed: Oct. 15, 1984

[51] Int. Cl.⁴ .............................................. C01B 33/12
[52] U.S. Cl. .................................... 423/335; 423/38; 423/46; 423/98; 423/109; 423/150; 423/DIG. 19; 423/340; 75/101 R; 75/114; 75/117; 75/120; 75/121
[58] Field of Search ...................... 423/335, 46, 94, 98, 423/103, 109, 38, 340, DIG. 19; 75/101 R, 120, 108, 114, 117, 121

[56] References Cited

U.S. PATENT DOCUMENTS

| | | | |
|---|---|---|---|
| 1,696,471 | 12/1928 | Christensen | 423/94 |
| 4,202,864 | 5/1980 | Spevack | 423/DIG. 19 |
| 4,348,228 | 9/1982 | Zarur | 75/101 R |
| 4,372,782 | 2/1983 | Salter et al. | 423/94 |

Primary Examiner—Robert L. Stoll
Attorney, Agent, or Firm—Walter A. Hackler; Howard R. Lambert

[57] ABSTRACT

A process is provided for reducing the total concentration of heavy metals, notably lead, copper and zinc, naturally occurring in silica-rich sludge precipitated from geothermal brine in a brine handling system such as a geothermal brine electric generating plant. The process includes washing the sludge with hot water to displace any brine entrapped in the sludge, dewatering the washed sludge and leaching the silicious solids residue with hydrochloric acid having a concentration of between about 2 and about 9 weight percent and an acid-to-sludge weight ratio between about 0.10 and about 0.33. The acid-sludge mixture is heated to a temperature of at least about 50° and the leaching time is at least about one hour. The leaching solution is separated from the leached sludge and the solids residue are washed with water. Preferably the water used in both washing steps is condensate of steam derived from the geothermal brine. Effluent from the process is preferably combined with the brine for reinjection.

40 Claims, 7 Drawing Figures

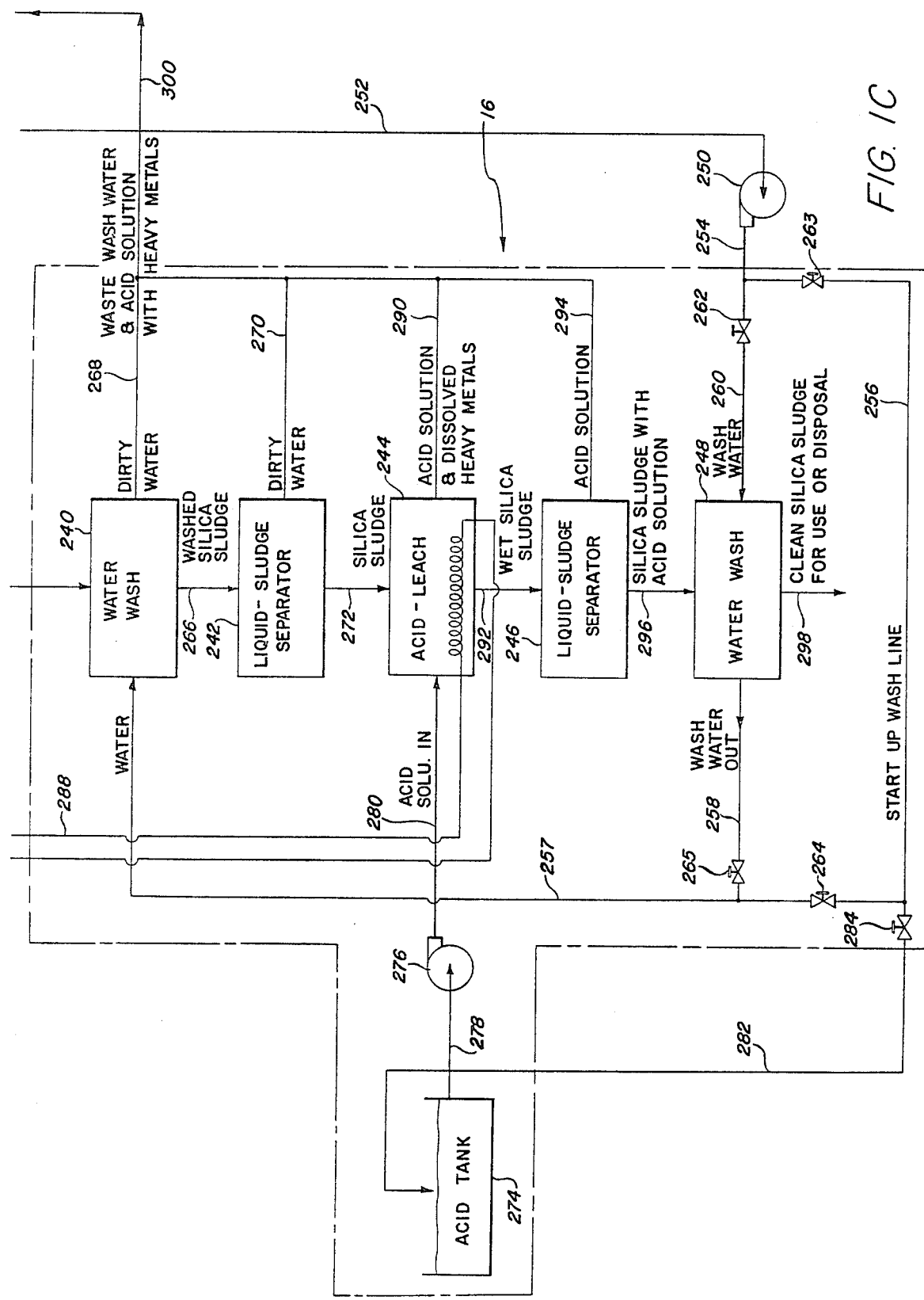
FIG. IC

PROCESS FOR REDUCING THE CONCENTRATION OF HEAVY METALS IN GEOTHERMAL BRINE SLUDGE

BACKGROUND OF THE INVENTION

1. Field of the Invention

The present invention relates generally to the production of electric power by use of geothermal fluids and more particularly to processes for reducing the heavy metal content of geothermal sludge formed during use of geothermal brine to produce electric power.

2. Discussion of the Prior Art

Large subterranean aquifers of naturally produced (geothermal) steam or hot aqueous liquids, specifically water or brine, are found throughout the world. These aquifers, which often have vast amounts of energy potential, are most commonly found where the earth's near-surface thermal gradient is abnormally high, as evidenced by unusually great volcanic, fumarole or geyser activity. Thus, as an example, geothermal aquifers are fairly common along the rim of the Pacific Ocean, long known for its volcanic activity.

Geothermal steam or water has, in some regions of the world, been used for centuries for therapeutic treatment of physical infirmities and diseases. In other regions, such geothermal fluids have long been used to heat dwellings and in industrial processes. Although efforts to further develop geothermal resources for these site-restrictive uses continue, considerable recent research and development has, instead been directed to exploitation of geothermal resources for production of electrical power which can be conducted, often over existing power grids, for long distances from the geothermal sources. In particular, recent steep increases in the cost of petroleum products used for conventional production of electric power, as well as actual or threatened petroleum fuel shortages or embargos have intensified the interest in use of geothermal fluids as an alternative and generally self-renewing source of power plant "fuel".

General processes by which geothermal fluids can be used to generate electric power are known and have been known for some time. As an example, geothermal steam, after removal of particulate matter and polluting gases such as hydrogen sulfide and ammonia, can be used in the manner of boiler-generated steam to operate steam turbine generators.

Naturally pressurized geothermal brine or water having a temperature of over about 400° F. can be flashed to a reduced pressure to convert some of the brine or water to steam. The steam produced in this manner can then be used to drive steam turbine generators. The flashed geothermal liquid and the steam condensate obtained from power generation can typically be reinjected to replenish the aquifer and prevent ground subsidence. Cooler geothermal brine or water can often be used to advantage in binary systems in which a low-boiling point, secondary liquid is vaporized by the hot geothermal liquid, the vapor produced being used to operate gas turbine generators.

As might be expected, use of geothermal steam is preferred over use of geothermal water or brine for generating electric power because the steam can be used more directly, easily and cheaply. Consequently, where readily and abundantly available, geothermal steam has been used for a number of years to generate commercially important amounts of electric power at favorable costs. For example, by the late 1970's geothermal steam at The Geysers in Northern California was generating about two percent of all of California's electricity consumption.

While energy production facilities at important geothermal steam sources, such as at The Geysers, are still being expanded, when not already at capacity, the known number of important geothermal steam aquifers is small compared to those of geothermal brine or water. Current estimates are, in fact, that good geothermal brine or water sources are about five times more prevalent than are good sources of geothermal steam. The potential for generating electric power is, therefore, much greater for geothermal brine and water than it is for geothermal steam. As a result, considerable current geothermal research is understandably directed towards the development of economical geothermal brine and water electric generating plants, much of this effort being expended towards use of vast geothermal brine resources in the Imperial Valley of southern California.

Although, as above mentioned, general processes are known for using geothermal brine or water for production of electric power, serious problems, especially with the use of highly saline geothermal brine, have often been encountered in practice. These problems have frequently been so great as to prevent the production of electric power at competitive rates and, as a consequence, have greatly impeded the progress of geothermal brine power plant development in many areas.

These severe problems relate primarily to the typically complex composition of geothermal brines. At natural aquifer temperatures in excess of about 400° F. and pressures in the typical range of 400 to 500 psig, the brine leaches large amounts of salts, minerals and elements from the aquifer formation. Thus, although brine composition may vary from aquifer to aquifer, wellhead brine typically contains very high levels of dissolved silica as well as substantial levels of dissolved heavy metals such as lead, zinc and cadmium. In addition, many other impurities, particulate matter and dissolved gases are present in most geothermal brines.

As natural brine pressure and temperature are substantially reduced in power plant steam conversion (flashing) stages, silica saturation levels in the brine are typically exceeded and silica precipitates from the brine, as a tough scale, onto surrounding equipment walls and in reinjection wells, often at a rate of several inches in thickness per month. Scale, so formed, typically comprises iron-rich silicates, and is usually very difficult, costly and time consuming to remove from equipment. Because of the fast growing rates, extensive facility down time for descaling operations may commonly be required at some geothermal brine facilities. Injection wells may also require frequent and extensive rework and new injection wells may, from time to time, have to be drilled at great cost.

Considerable effort has, as a consequence, been directed towards developing processes for eliminating or controlling silica scaling from geothermal brine. One scale reduction process of particular interest involves induced precipitation of silica from the brine in the flashing stage by utilizing seed crystallization techniques. Thus, when silica saturation levels are exceeded in the flashing vessels, the "excess" silica preferentially crystallizes from the brine onto seed crystals which are intentionally introduced into the vessels. Typically, the crystallized silica precipitate is settled from the brine in a downstream reactor-clarifier stage, the clarified brine being flowed on to a filtering stage and then to a reinjection stage. Some of the silica precipitate (sludge) from the reactor clarifier may be pumped back upstream into the flash crystallization stage as seed material, the remainder being dewatered and removed from the facility for disposal. The amount of such silica sludge requiring disposal is relatively large; for example, for a 10 megawatt power plant requiring a brine flow rate of about 1.3 million pounds an hour, as much as about six tons a day of silica sludge may be produced and require disposal.

During the silica crystallization process, many other materials are removed from the brine along with the silica. Thus, the produced sludge, herein referred to as silica sludge, although mostly silica, may also contain significant amounts of barite and heavy metals, such as lead, copper and zinc, which above specific levels of concentration, may be considered as toxic and therefore require disposal at specially designated toxic waste dumps. The costs associated with disposal of toxic silica sludge are substantial and can be expected to increase as additional and larger geothermal brine power plants are constructed and produce more sludge, as allowable concentrations of heavy metals in the sludge are reduced to meet anticipated stricter environmental requirements and as toxic waste dumps become fewer and/or more remotely located.

As an alternative to disposing of silica sludge as a toxic waste, attempts have been made to detoxify geothermal brine sludge by substantially reducing the concentration therein of heavy metals, particularly of lead, copper and zinc, below allowed levels. However, because of the complex composition of the geothermal brine, and hence of the silica sludge crystallized and precipitated therefrom, conventional heavy metal extraction processes have been found not to work as expected and/or not to be economical compared to the cost of transporting the untreated sludge to a toxic waste disposal site.

Therefore, an object of the present invention is to provide a relatively effective and economical process for reducing the heavy metal concentration of geothermal brine sludge.

It is another object of the present invention to provide a process for reducing the concentration of heavy metals in geothermal brine sludge which is compatible with present types of geothermal brine power plants.

Additional objects, features and advantages of the present invention will become apparent to those skilled in the art from the following description, when taken in conjunction with the accompanying drawings.

SUMMARY OF THE INVENTION

According to the present invention, a process for reducing the total concentration of heavy metals in silica sludge precipitated from a flow of geothermal brine comprises first washing the silica sludge with hot water, so as to replace any geothermal brine entrapped in the sludge, and then contacting the washed sludge with a hydrochloric acid solution having an acid-to-sludge weight ratio causing the pH of the acid-sludge mixture to be less than about 1. The process further includes separating the silicious solids residue from the hydrochloric acid solution, and then washing the solids residue with water to flush the hydrochloric acid solution from the silicious residue, thereby leaving a clean, leached residue of reduced heavy metal content.

Preferably, the length of contacting time is greater than about one hour and more preferably is about four hours. Also preferably, the step of washing the silica sludge with water comprises washing the sludge with water having a temperature of at least about 50° C.

In a geothermal brine power plant using geothermal brine which has a wellhead pressure of several hundred psig and in which the brine flow is flashed to a lower pressure to convert some of the brine to steam and the steam is subsequently used and condensed to water, the steps of washing the sludge or residue with water preferably comprises washing the sludge with the steam condensate. Moreover, the step of washing the sludge with hot water includes using the wash water from the solids residue washing step.

The step of contacting the washed sludge with a hydrochloric acid solution preferably includes contacting the washed sludge with the hydrochloric acid solution at a temperature of at least about 80° C. and preferably at a temperature between about 90° C. and about 95° C. Also, the step of contacting the washed sludge with a hydrochloric acid solution includes adjusting the amount of hydrochloric acid used so that the weight ratio of hydrochloric acid to sludge is typically between about 0.10 and about 0.25 and is preferably about 0.22. The weight percent concentration of hydrochloric acid in the leaching solution is preferably between about 2 and about 9 and is more preferably between about 3.3 and about 6. Preferably, included in the process is the step of combining the water used to wash the sludge and the hydrochloric acid leaching solution used to contact the washed sludge with the flow of geothermal brine from which the sludge is precipitated.

Preferably the process also includes the step of combining the used wash water and acid solution with the flow of geothermal brine for reinjection into the ground. Also preferably, the step of contacting the washed sludge with a hydrochloric acid solution includes agitating the mixture of acid solution and sludge so as to assure proper leaching action. The process may further include the addition of sodium chloride to the hydrochloric acid leaching solution to enhance the solubility of lead from the sludge. Preferably the weight percent of added sodium chloride is between about 5 and about 20.

An effective and cost-efficient process for reducing the content of heavy metals, particularly lead, copper and zinc, from geothermal brine sludge is thereby provided.

BRIEF DESCRIPTION OF THE DRAWINGS

The present invention will be more readily understood by reference to the drawings in which:

FIGS. 1A–1C are schematic drawings showing in simplified form an exemplary flashed geothermal brine electric power plant in which the silica sludge treatment process, according to the present invention may be practiced to advantage;

DESCRIPTION OF THE PREFERRED EMBODIMENT

Figure 1A:
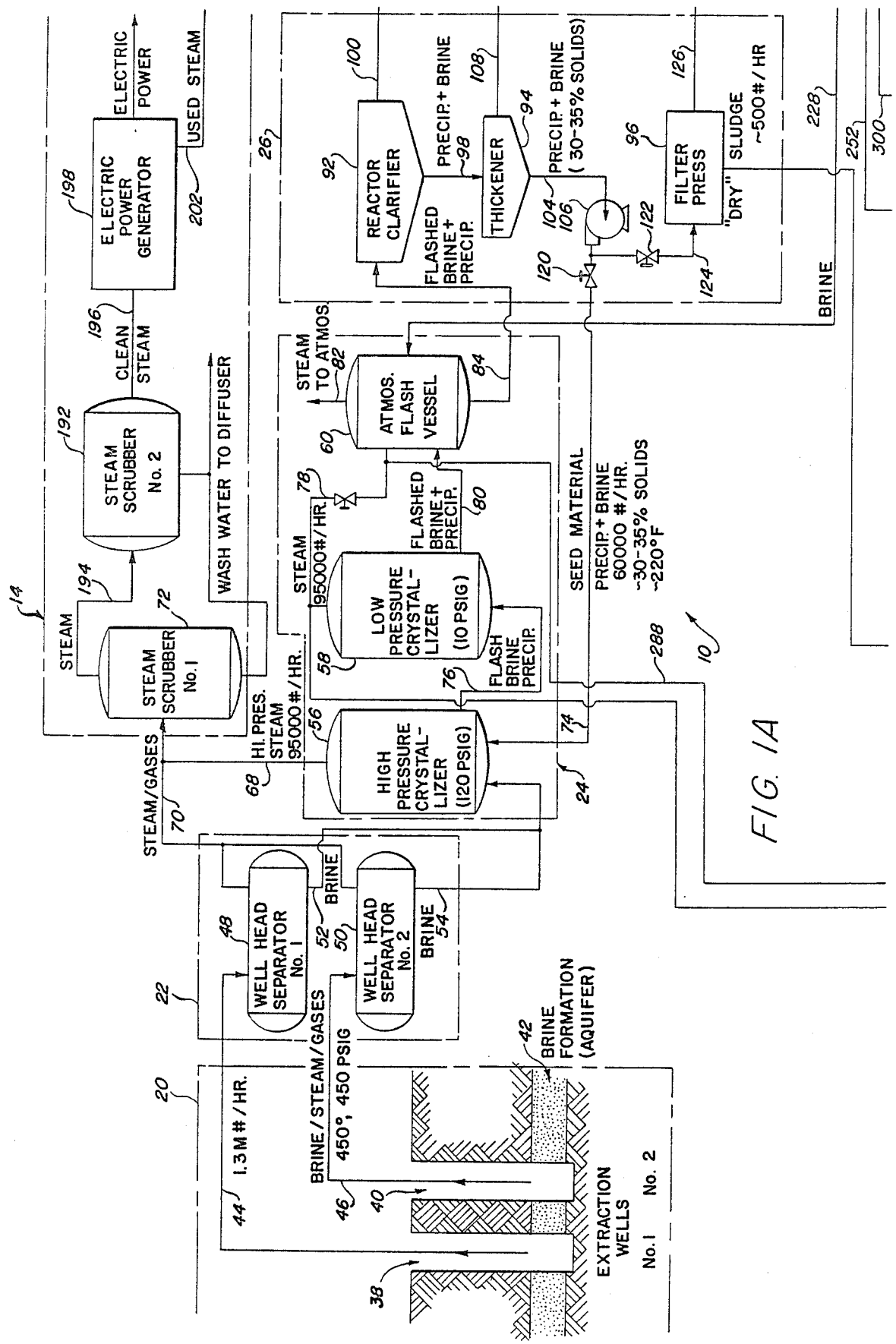
Figure 1B:
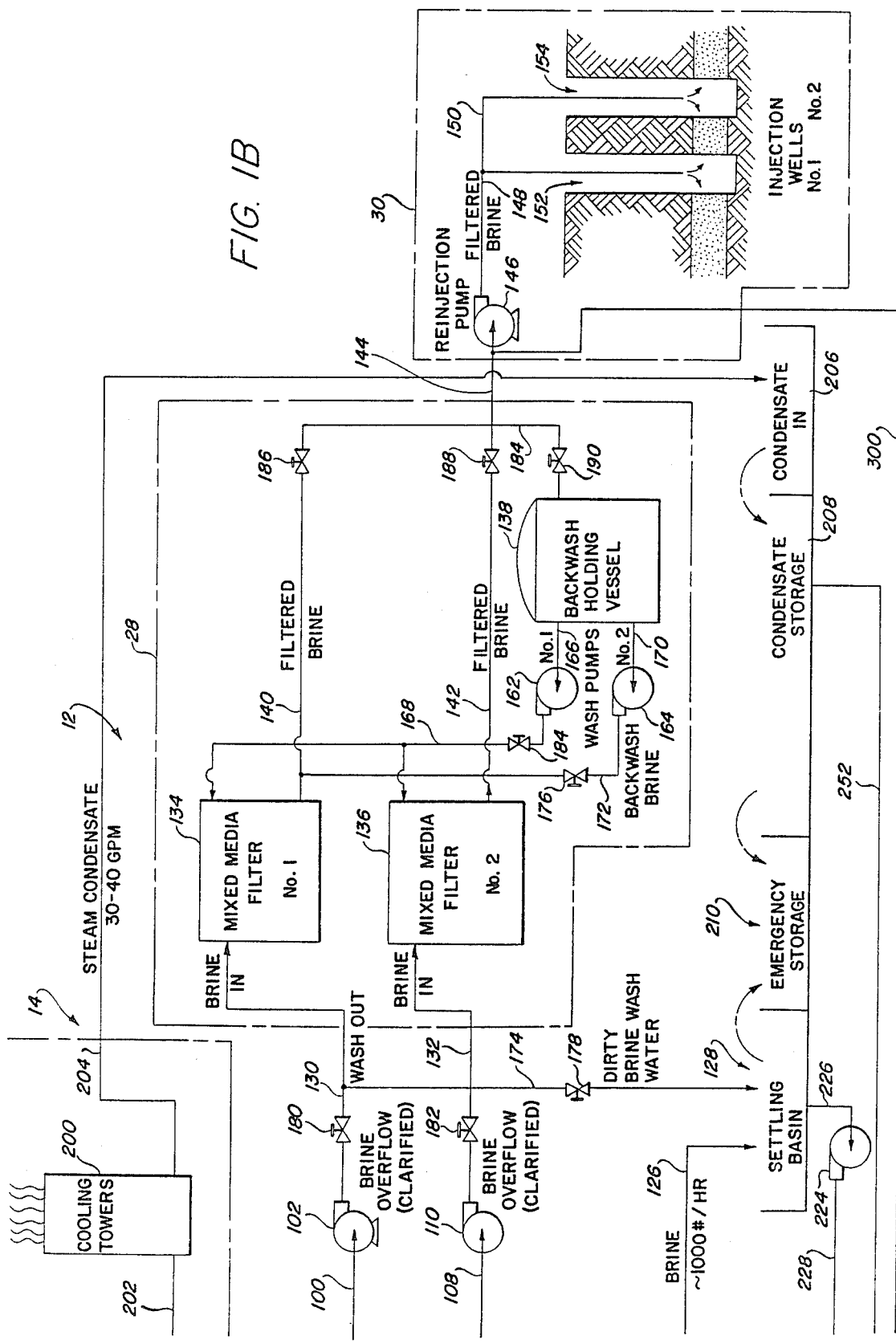

The present process for reducing the total concentration of heavy metals, notably of lead, zinc and copper, from geothermal brine sludge can be better understood by the consideration of an exemplary geothermal brine power plant with which the present Applicants' process may be used to advantage. Shown, therefore, in simplified form in FIG. 1 is an exemplary geothermal brine power plant 10 which comprises generally a brine handling portion 12 and an electric power generating portion 14 (both partially in FIGS. 1A and 1B). Associated with brine handling portion 12 is a sludge treating portion 16 (shown in FIG. 1C) in which, as more particularly described below, the present invention is practiced.

In general, the function of brine handling portion 12 is the extraction of hot pressurized geothermal brine from the ground, conversion by a flashing process, of part of the brine to steam for use by power generating portion 14 and reinjection into the ground of the flashed brine and of steam condensate (if any) returned from the power plant portion. Function of power generating portion 14 is use of steam from brine handling portion 12 for the production of electric power. In turn, the function of sludge treating portion 16 is to reduce the concentration of heavy metals, including lead, zinc and copper, from geothermal sludge produced by brine handling portion 12 in a scale-preventing process described below.

Brine handling portion 12, comprises generally a brine extraction stage 20, a wellhead separation stage 22, a steam production (flashing) and silica crystallization stage 24, a brine clarification stage 26, a brine filtering stage 28 and a brine reinjection stage 30.

More specifically, brine extracting stage 20, as shown in FIG. 1A, includes first and second geothermal brine extraction wells 38 and 40 by means of which geothermal brine is extracted from a common underground aquifer 42. At the wellhead, the geothermal brine may typically have a temperature of between about 400° F. and about 600° F. and be at a natural pressure of between about 400 psig and about 500 psig. At the mentioned high temperature and pressure, the geothermal brine dissolves substantial amounts of minerals and elements from aquifer formation 42. In particular, the brine normally contains considerable dissolved salts (hence, the termination "brine") and is typically saturated or nearly saturated with silica. Moreover, the brine may contain appreciable amounts of dissolved heavy metals, including lead, zinc, copper cadmium and iron. The brine may, in addition contain lesser amounts of other heavy metals such as nickel, chromium, molybdenum, silver, manganese, and other metals such as arsenic, antimony and beryllium. Gases such as hydrogen sulfide, ammonia and carbon dioxide may also be intermixed with the brine. The brine thus comprises heavily contaminated water and may typically have a wellhead pH of about 5 to 5.5, being thereby slightly acidic.

From wells 38 and 40, the brine is fed, through conduits 44 and 46 to respective first and second wellhead separators 48 and 50 which comprise separater stage 22. In wellhead separators 48 and 50 geothermal steam mixed with the brine, such non-condensable gases as hydrogen sulfide and ammonia, and particulate matter (sand and gravel) are separated from the brine.

From wellhead separators 48 and 50, the brine is fed through conduits 52 and 54 into the bottom of a high pressure flash crystallizer 56 which, together with a low pressure flash crystallizer 58 and an atmospheric flash vessel 60 comprise steam production (flashing) and silica crystallization stage 24. In high pressure flash crystallizer 56 the brine is flashed to a reduced pressure of, for example, about 120 psig so as to convert part of the brine into steam. For example, for an exemplary flow of about 1.3 million pounds of 400° F. and 400 psig brine per hour into high pressure flash crystallizer 56, about 95,000 pounds 120 psig of steam is produced. Such steam is discharged through a conduit 68 which joins a common steam/gas discharge conduit 70 from wellhead separators 48 and 50. Conduits 68 and 70 discharge into a common conduit 72 which delivers steam to first steam scrubber 72 of power generating portion 14.

Silica seed material is fed, through a conduit 74, into high pressure flash crystallizer 56 from brine clarification stage 26, as described below. Within crystallizer 56, silica from the brine, which typically becomes supersaturated in silica as a result of being flashed to a reduced pressure, preferentially crystallizes or precipitates onto the seed material which is circulated in a reverse flow direction relative to the brine circulation flow direction.

From high pressure flash crystallizer 56, brine and crystallized silica material are flowed through a conduit 76 into the bottom of low pressure flash crystallizer 58 wherein the brine is flashed to a reduced pressure of, for example, about 10 psig. In this second flashing step, additional brine is converted to steam. For the exemplary brine flow rate mentioned above, the amount of steam produced in low pressure flash crystallizer 58 may also be about 95,000 pounds per hour. Such additionally produced steam which has relatively low energy content, may be used for auxilliary heating or the like or, as shown, may be discharged from low pressure crystallizer 58 through a conduit 78 into atmospheric flash vessel 60. Within low pressure flash crystallizer 58, silica crystallization from the brine continues onto the silica particles entrained in the brine. From crystallizer 58, brine and the entrained silica precipitate matter are flowed through conduit 80 to atmospheric flash vessel 60.

In atmospheric flash vessel 60, the brine is flashed to atmospheric pressure, releasing still more steam. Typically, such steam is released, through a conduit 82, into the atmosphere. Alternatively, the steam may be used for heating or the like. Silica crystallization from the brine continues in atmospheric flash vessel 60. Brine and silica material are discharged from vessel 60, through a conduit 84, to a recirculating, reverse flow, reactor-clarifier 92 which, together with a thickener 94 and a filter press 96, comprise brine clarification stage 26. Within reactor-clarifier 92, the silica material is allowed to settle as a sludge which is removed with some brine from the bottom of the reactor-clarifier through a conduit 98. Clarified brine, still containing amounts of very fine silica particulate matter, is discharged from reactor-clarifier through a conduit 100 to a first filter pump 102. Wet silica sludge is delivered, through conduit 98 to sludge thickener 94 in which most of the brine is removed from the sludge. De-watered sludge is discharged from thickener 94, through a conduit 104, to a sludge pump 106. Brine from thickener 94 is discharged, through a conduit 108 to a second filter pump 110.

Sludge pump 106 pumps part of the silica sludge from conduit 104 through conduit 74 into high pressure flash crystallizer 56 as seed material and the rest of the sludge through a conduit 124 into filter press 96. Valves 120 and 122 in respective conduits 74 and 124 control sludge flow from sludge pump 106. Brine from filter press 96 is flowed through a conduit 126 to a setting basin 128. "Dry" sludge (still containing small amounts of brine) is discharged from filter press 96 to silica sludge treatment portion 16 for treatment as described below. For the mentioned brine flow rate of about 1.3 million pounds per hour, "dry" sludge may be discharged from filter press at a rate of about 500 pounds per hour (six tons per day).

Brine pumps 102 and 110 pump brine from reactor clarifier 92 and thickener 94, through conduits 130 and 132, into first and second media filters 134 and 136 which, with backwash holding vessel 138, comprise brine filtering stage 28. From filters 134 and 136 filtered brine is flowed, through respective conduits 140 and 142 and common conduit 144, to a reinjection pump 146. From pump 146, the filtered brine is discharged, through conduits 148 and 150, into first and second injection wells 152 and 154, respectively, pump 146 and such wells comprising reinjection stage 30.

Included in filtering stage 28 are first and second backwash pumps 162 and 164 which are connected between holding vessel 138 and filters 136 and 138 by conduits 166, 168, 170 and 172, as shown in FIG. 1B. A backwash dirty water conduit 174 is connected between conduits 132 and 134 and setting basin 128. Various valves 176, 178, 180, 182 and 184 control backwash water flow. Water for backwash filters 136 and 138 is obtained from conduits 140 and 142 by a conduit 184; valves 186, 188 and 190 control flow of brine from filters 136 and 138 into pump 146 and holding vessel 138.

In power generating portion 14, steam is flowed from first steam scrubber 72 to a second steam scrubber 192 through a conduit 194. From second scrubber 192, clean steam is fed through conduit 196 to turbine generator 198. "Used" steam is discharged from generator 198 to a cooling tower 200 through a conduit 202. From tower 200 steam condensate at a rate, for example, of about 30–40 gallons per minute, is fed through a conduit 204 back to a "condensate in" vessel 206. From vessel 206 the condensate overflows into a condensate storage vessel 208. An emergency overflow storage pond 210 is in overflow communication between condensate storage vessel 208 and brine setting basin 108. Typically brine from setting basin 128 is pumped by a brine pump 224, through conduits 226 and 228, back to atmospheric flash vessel 60 for combining therein with brine from low pressure flash crystallizer 58.

It is to be understood that power plant 10 is shown in FIG. 1 merely by way of example and, as such, has been shown somewhat simplified over an actual power plant which has a great many valves, conduits, controls and the like not shown or described. Also, for example, an actual geothermal brine power plant may have more than the two extraction wells 38 and 40, the two separators 48 and 50, the two filters 134 and 136 and the two injection wells 152 and 154 shown.

SILICA SLUDGE TREATMENT

It has now been discovered in the present invention that the heavy metal content of the silica sludge obtained from filter press 96 cannot be effectively reduced using conventional processes. Although "dewatered" to a considerable extent in filter press 96, the sludge typically contains significant amounts of entrapped brine, and various materials in the brine operate as buffers which inhibit conventional heavy metal extraction processes.

Moreover, it has now been found that silica treatment stage 16 has to be compatible with power plant 10. As can be appreciated from the above description, power plant 10 is substantially a closed system which operates between extraction wells 38 and 40 and injection wells 152 and 154. Various brine and steam flows within power plant 10 are combined in particular stages so as not to upset the critical silica crystallization operation in flash crystallizer 56 and 58 and the critical separation of brine and silica precipitate in reactor-clarifier 92. In particular, upsetting of operation of reactor-clarifier 92 causes an excessive amount of silica precipitate to be carried with the brine into filtering stage 28, with the result that filters 134 and 136 are overloaded, with possible subsequent equipment scaling and damage to injection wells 152 and 154.

For cost effectiveness and compatibility, silica treatment stage 16 is seen from FIG. 1 to receive liquids (wash water) from, and to discharge liquids (dirty wash water and acid leach solution) to, brine handling portion 12 as more particularly described below. Comprising silica treatment stage 16 are an initial pre-wash stage 240, a first liquid-sludge separation stage 242, an acid leaching stage 244, a second liquid-sludge separation stage 246 and a final wash stage 248. In initial wash stage 240, "dry" sludge from filter press 96 is washed with sufficient water (not brine) to flush out and replace any brine remaining entrapped in the sludge when the sludge is discharged from the filter press. This initial wash water thus eliminates buffering agents contained in the brine which may adversely affect the subsequent acid leaching operation described below.

During any sludge treatment start up phase, water for the initial wash stage 240 is preferably provided, by a pump 250 and through conduits 252, 254 256 and 257 from condensate storage vessel 208. As a result of using condensate of steam originally obtained from the brine flow, the wash water in wash stage 240 is compatible with the brine entrained in the sludge and no scaling, additional precipitate, buffering compounds or undesirable materials are formed. After start up, the wash water used in wash 240 is preferably the wash water discharged into conduit 257, via a conduit 258, from final wash stage 248, wash water being provided to such stage, through a conduit 260, by pump 250. Valves 262, 263, 264 and 265 in respective conduits 260, 256, 257 and 258, control flow of water from pump 250 into and/or bypassing final wsh stage 248.

Washed sludge from initial wash stage 240 is transported, for example, through a conduit 266, to first liquid-sludge separating stage 242 wherein wash water entrained in the sludge is removed to the extent practical. "Dirty" wash water from initial wash stage 240 and from first separating stage 242 is discharged through respective conduits 268 and 270.

Dewatered sludge is transported from first separating stage 242 to acid leach stage 244 via a conduit 272. An acidic leaching solution is fed into leaching stage 244 from an acid supply vessel 274 by a pump 276 and through conduits 278 and 280. Preferably, the acid leach solution comprises a solution of hydrochloric acid having a weight ratio of hydrochloric acid relative to the weight of sludge being leached that maintains the pH of the leaching solution-sludge mixture below about 1. Typically, such a mixture pH level is maintained with a hydrochloric acid-to-sludge weigh ratio of at least about 0.1. The concentration of hydrochloric acid in the leach solution, which as discussed below, is preferably between about 2.1 and about 8.4 percent, takes into account the amount of wash water remaining entrained in the sludge. Water for making up the acid solution in tank 274 may be steam condensate provided by pump 250 via conduits 254 and 256 to a conduit 282 and is controlled by a valve 284 in conduit 282.

It has been found advantageous both to agitate the leach solution-sludge mixture in leaching stage 244, so as to minimize surface effects, and to heat the mixture to a temperature preferably of at least about 50° C., also as discussed below. Such heating may, for example, be provided by means of a steam line 288 shown connected to steam output conduit 78 from low pressure flash crystallizer 58. For the above-mentioned preferred leach acid concentrations and temperatures, a leaching time of at least about one hour is preferred.

From leaching stage 244, "used" leaching solution, with dissolved heavy metals such as lead, zinc and copper, is discharged through a conduit 290. Leached silica sludge is discharged from leaching stage 244 into second liquid-solids separating stage 246 through conduit 292. Separated leaching solution is discharged from separating stage 246 through a conduit 294 and silica sludge is discharged to final wash stage 248 through a conduit 296.

In final wash stage 248, the silica sludge is washed, as shown, by steam condensate provided through conduits 252, 254 and 260 by pump 250 from condensate supply 208. Clean, leached sludge is discharged from final wash stage 248 through conduit 298 for such uses as land fill or construction, and may be dewatered and/or compressed as necessary. Wash water from final wash stage 248 is, as above-described, preferably discharged through conduits 258 and 256 to initial wash stage 240.

Conduits 268, 270, 290 and 294 are connected to a common conduit 300 which is, in turn, connected to filtered brine conduit 144 upstream of reinjection pump 146. Such connection into reinjection conduit 144 enables wash water to be discharged from initial wash stage 240 through conduit 268 and from first separation stage 242 through conduit 270, and leaching solution discharged from leach stage 244 and second separation stage 246 discharged through respective conduits 290 and 294, to be combined with the filtered brine from filtering stage 28 for reinjection into the ground.

Because problems may otherwise be associated with disposal of the effluent from sludge treatment stage 16, particularly of the leach solution from leaching and separation stages 244 and 246, it is important that the effluent be disposed of by reinjection, as above-described. However, to avoid the causing of reinjection scaling problems, it is highly preferred that the effluent from sludge treatment phase 16 be fully compatible with the brine with which the effluent is combined. For example, the combining with geothermal brine of effluent derived from use of irrigation or other available water used as sludge wash water or as leach solution make-up water might cause the formation of sulfates or other compounds which could, in time, cause plugging up of injection wells 152 and 154. Therefore, the use of steam condensate from condensate storage vessel 208 for sludge washing and for make-up of the leaching solution in acid tank 274 (via a conduit 282 connected to conduit 256) is an important consideration to the disposal of effluent from treatment stage 16.

As above-mentioned, it has now been determined that acid-to-sludge weight ratio, leach solution concentration as well as the contact time thereof with the sludge and the mixture temperature during the contacting time is important to the economical extraction of heavy metals from the silica sludge entering treatment stage 16. Obviously, to be practical, the heavy metal extraction process must be less costly that the disposal of untreated sludge. Thus, the acid leaching process must be capable of treating the continually produced sludge with minimum requirement for equipment and facilities, and with the use of minimal amounts of leaching acid consistent with satisfactory reduction in heavy metal content in the sludge being treated. Moreover, the sludge treating process should be compatible with geothermal brine power plant 10 so that, for example, the amount of wash water used is consistent with the rate at which steam condensate is produced and so that effluent from treatment stage 16 may be reinjected, in stage 30, without causing problems.

The post-leaching residual concentrations of lead, copper and zinc in the brine sludge are found to be decreased by increasing the hydrochloric acid concentration, increasing acid weight ratio to sludge, by increasing leaching temperature and/or by increasing leaching time, the most significant variable in this respect having been determined to be hydrochloric acid concentration. Thus, by increasing any one or combinations of these four mentioned variables, the residual content of lead, copper and zinc, as well as of many other elements, may be reduced to virtually any practical level desired. With specific regard to lead, its removal from the sludge can be enhanced by the addition of sodium chloride, preferably in weight percentages between about 5 and about 20, to the hydrochloric acid leaching solution.

Ordinarily, however, it will be desired to remove only that amount of elements, particularly lead, copper and zinc, from the brine sludge which will render the sludge capable of disposal or use as a non-toxic material by whatever particular definition of toxicity may currently be applied. To this end, it has now been determined, therefore, that to provide an effective and economical process for substantially reducing the heavy metal content in geothermal brine sludge, the leaching solution preferably contains between about 2 and about 9 weight percent, more preferably between about 3.3 and about 6 weight percent and most preferably about 3.3 weight percent of hydrochloric acid. The acid-to-sludge ratio is preferably between about 0.10 and about 0.33, more preferably between about 0.17 and about 0.22 and most preferably about 0.22. The leaching temperature is preferably above about 50° C. and more preferably between about 90° C. and about 95° C. The leaching time is preferably at least about 60 minutes and is more preferably about 4 hours.

The invention will be further described with reference to the following Examples.

EXAMPLE 1

A sample of geothermal brine sludge, obtained from power plant filter press 96, is washed in hot water (60° C. to 65° C.) with stirring and the slurry is filtered. The filter cake is repulped with hot water and the slurry is again filtered and the filter cake is spray washed with water until the wash water is free of chloride as determined by silver nitrate testing.

Lead, copper and zinc concentrations of the washed sludge are found to be about 7400 parts per million (ppm) by weight; about 4400 ppm and about 530 ppm, respectively. The sludge sample is then divided into a number of smaller samples each weighing about 50 grams (dry weight). Each 50 gram sample is subjected to a different hydrochloric leaching condition, the acid concentrations, acid-to-sludge weight ratio, leaching times and leaching temperatures being varied from test to test to determine the effects of such variations.

At the end of each test, concentration levels of lead, copper and zinc in the leached and washed sludge are determined and recorded.

Results of the various tests are plotted in FIGS. 2-5. In such Figures, post-leaching, residual concentrations of lead, copper and zinc are plotted, respectively, against acid concentration ranging between about 2.2 and about 8.4 weight percent; acid-to-sludge weight ratio ranging between about 0.13 and about 0.20, leaching temperature ranging between about 22° C. and about 94° C. and leaching time ranging between about 15 minutes and about 60 minutes.

Figure 2:
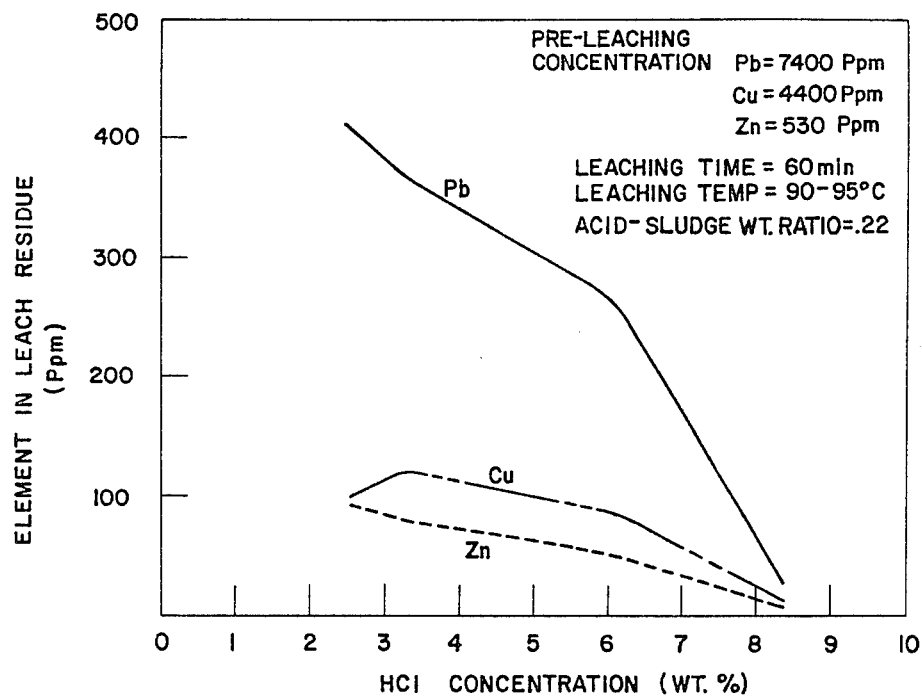
FIG. 2 is a graph plotting post-leaching sludge concentration of lead, copper and zinc vs leaching acid concentration, with leaching time and temperature and leaching acid-to-sludge weight ratio held constant.

For FIG. 2, the hydrochloric acid-to-sludge weight ratio for all the sludge samples involved is about 0.22, the leaching time is about 60 minutes and the leaching temperature is between about 90° C. and about 95° C. As shown, for use of a hydrochloric acid concentration, for example, of about 3.3 weight percent, the residual concentrations of lead, copper and zinc are reduced from their above-mentioned initial values to respectively about 380 ppm, about 120 ppm and about 80 ppm. By using an 8.4 weight percent of hydrochloric acid, the residual concentrations of lead, copper and zinc are all reduced from their initial values to less than about 30 ppm.

Figure 3:
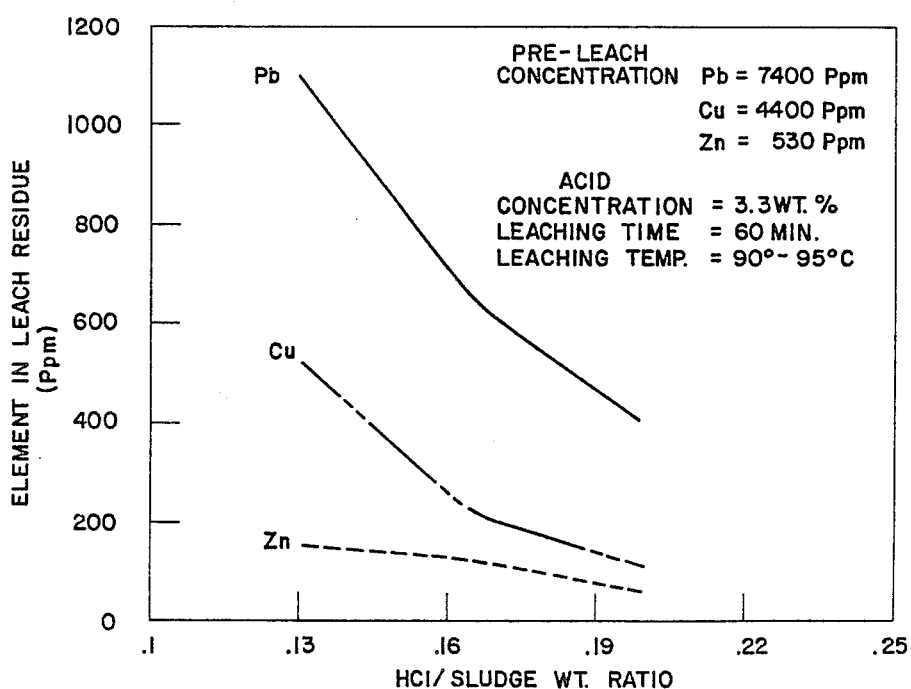
FIG. 3 is a graph plotting post-leaching sludge concentrations of lead, copper and zinc vs acid-to-sludge weight ratio, with leaching time and temperature and leaching acid concentration held constant.

For all sludge samples from which FIG. 3 is plotted, a leaching time of about 60 minutes is used. A leaching temperature of between about 90° C. and about 95° C. is used and a hydrochloric acid concentation of about 3.3 weight percent is used. Residual concentrations of lead, copper and zinc are, for example, seen to be reduced from their initial concentration levels to, respectively, about 1100 ppm, about 510 ppm and about 155 ppm by use of a hydrochloric acid-to-sludge weight ratio of 0.13. When such ratio is increased to about 0.20, the respective residual levels are reduced from initial levels to about 410 ppm, about 130 ppm and about 80 ppm.

Figure 4:
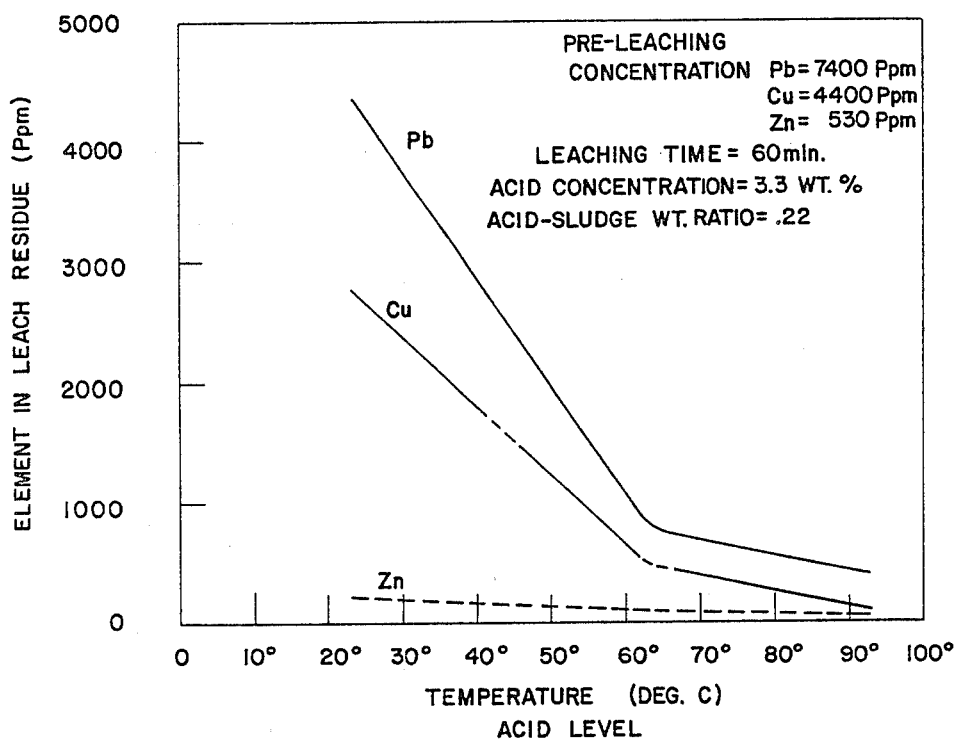
FIG. 4 is a graph plotting post-leaching sludge concentrations of lead, copper and zinc vs leaching temperature, with leaching time and leaching acid concentration and weight ratio to sludge held constant.

With respect to FIG. 4, all sludge samples involved were leached with hydrochloric acid having a concentration of about 3.3 weight percent and a weight ratio relative to the sludge of about 0.22, for a leaching time of about 60 minutes. Shown in FIG. 4, for example, is that for a leaching temperature of about 22° C., the concentrations of lead, copper and zinc are reduced from their initial levels to, respectively, about 4450 ppm, about 2800 ppm and about 200 ppm. However, at a leaching temperature of about 93° C., the respective residual concentrations of lead, copper and zinc are about 450 ppm, about 220 ppm and about 180 ppm.

Figure 5:
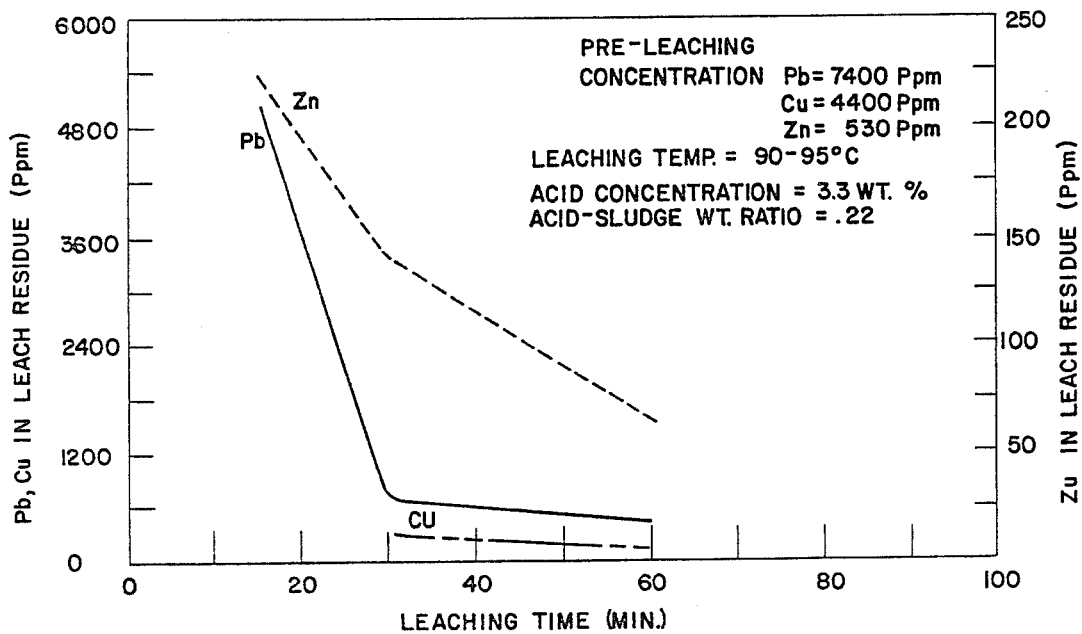
FIG. 5 is a graph plotting post-leaching sludge concentrations of lead, copper and zinc vs leaching time, with leaching temperature and leaching acid concentration and weight ratio to sludge held constant.

FIG. 5 plots the test results of sludge samples which are leached with a solution of about 3.3 weight percent of hydrochloric acid and an acid-to-sludge weight ratio of about 0.22. The leaching temperature is between about 90° C. and about 95° C. The residual concentrations of lead, copper and zinc are seen from FIG. 5 to decrease with increasing leaching time, as might be expected. For example, the residual concentration of lead is seen, for respective leaching times of 15, 30, and 60 minutes to be about 5100 ppm, about 600 ppm and about 450 ppm. Residual levels of copper, for respective leaching times of 30 and 60 minutes, are seen to be about 350 ppm and about 150 ppm. For zinc, the respective residual concentrations for 15, 30 and 60 minutes leach time are about 225 ppm, about 140 ppm and about 65 ppm, it being noted that a different scale is used in FIG. 5 for zinc concentration levels.

EXAMPLE 2

A sludge sample having a dry weight of approximately 700 grams is selected from the large geothermal brine sludge sample from which the samples of Example 1 were selected. Initial concentrations in the sludge sample of lead, copper and zinc are respectively about 7400 ppm, about 4400 ppm and about 530 ppm. The 700 gram sample is washed with water as described in Example 1. The washed filter cake (sludge residue) is leached in an approximate 3.3 weight percent solution of hydrochloric acid, the acid-to-sludge weight ratio of which is about 0.22. The leaching temperature is between about 90° C. and about 95° C. and the leaching duration is about 90 minutes. Then the slurry is filtered and the filter cake is washed and dried and the concentration levels of lead, copper and zinc are determined to be about 318 ppm, about 81 ppm and about 80 ppm, respectively.

In addition, pre and post-leaching concentrations of various other metals in the sludge are determined to be approximately as follows:

| Element | Pre-Leaching Conc./ppm Wt. | Post-Leaching Conc./ppm Wt. |
| --- | --- | --- |
| Beryllium | 43 | 5 |
| Cadmium | 18 | 7 |
| Chromium | 71 | 54 |
| Fluorine | 17,000 | 2,200 |
| Molybdenum | 17 | 7 |
| Nickel | 11 | 5 |
| Iron | 167,000 | 61,000 |

EXAMPLE 3

An additional sample, having a dry weight of about 300 grams, is selected from the large brine sludge sample of Examples 1 and 2, the 300 gram sample being washed with water in the manner described in Example 1. The washed filter cake is leached in an approximate 8.4 weight percentage solution of hydrochloric acid having an acid-to-sludge weight ratio of about 0.33. The leaching temperature is between about 90° C. and about 95° C. and the leaching duration is about 120 minutes with stirring. After filtering the slurry and washing and drying the filter cake, the concentrations in the residue of lead, copper, zinc and cadmium are determined to be about 104 ppm, about 61 ppm, about 18 ppm and less than about 5 ppm, respectively.

EXAMPLE 4

Sample Nos. 1 and 2, each having a dry weight of about 15-20 grams, are selected from an untreated sample of silica sludge obtained from geothermal brine. Concentrations of various elements in untreated sludge samples are shown in the following table. Selected sample No. 1 is washed with hot water, in the manner described above in Example 1; selected sample No. 2 is not washed. Both selected samples are separately leached in about 300 ml of 3.3 weight percent of hydrochloric acid for a time duration of about 30 minutes and at a temperature of between about 90° C. and about 95° C. Post leaching impurity concentations are measured for both samples. The results, listed in the following table, show that the acid leach is much more effective when the sample is washed to remove entrapped brine and/or the residue therefrom.

| Element | Untreated Concentration ppm wt. | Sample No. 1 Post Leach Concentration ppm wt. | Sample No. 2 Post Leach Concentration ppm wt. |
| --- | --- | --- | --- |
| Copper | >400 | <30 | <30 |
| Lead | 3100 | 50 | 217 |
| Zinc | 4200 | 289 | 774 |
| Iron | 137,000 | 16,000 | 113,000 |

Although particular embodiments of the present invention have been described, it is, of course, to be understood that the invention is not limited thereto, since many obvious modifications can be made, and it is intended to include within this invention any such modifications as will fall within the scope of the claims.

What is claimed is:

1. A process for reducing the total concentration of heavy metal in silica sludge precipitated from a flow of geothermal brine, the process comprising:
   (a) washing the silica sludge with hot water so as to replace with said water geothermal brine which is entrapped in said sludge;
   (b) contacting the washed sludge with a hydrochloric acid solution having a weight ratio of hydrochloric acid relative to said washed sludge causing the pH of the acid-sludge mixture to be less than about 1;
   (c) separating a silicious solids residue from the hydrochloric acid solution, and
   (d) washing the silicious solids residue with water to flush hydrochloric acid solution from said residue.

2. The process as claimed in claim 1 wherein the washed sludge is contacted with hydrochloric acid solution for at least about one hour.

3. The process as claimed in claim 2 wherein the preselected length of contacting time is about four hours.

4. The process as claimed in claim 1 wherein the step of washing the silica sludge with hot water comprises washing the sludge with water having a temperature of at least about 50° C.

5. The process as claimed in claim 1 in which the flow of geothermal brine has a wellhead temperature of at least about 400° F. and a wellhead pressure of at least about 400 psig, the brine flow being flashed to a lower pressure to convert some of the brine to steam, the steam being subsequently used and condensed to water, wherein both the steps of washing the sludge or silicious residue with water comprises washing the sludge or residue with said condensed steam.

6. The process as claimed in claim 1 wherein the step of washing the sludge with hot water includes using the wash water from the silicious solids residue washing step.

7. The process as claimed in claim 1 wherein the step of contacting the washed sludge with a hydrochloric acid solution includes contacting the washed sludge with the hydrochloric acid solution at a temperature of at least about 80° C.

8. The process as claimed in claim 7 wherein the contacting temperature is between about 90° C. and about 95° C.

9. The process as claimed in claim 1 wherein the concentration of hydrochloric acid in the leaching solution is between about 2 and about 9 weight percent.

10. The process as claimed in claim 9 wherein the concentration of hydrochloric acid in the leaching solution is between about 3.3 and about 6 weight percent.

11. The process as claimed in claim 1 wherein the step of contacting the washed sludge with a hydrochloric acid solution includes adjusting the amount of hydrochloric acid used so as to cause the weight ratio of hydrochloric acid-to-sludge to be between about 0.10 and about 0.33.

12. The process as claimed in claim 11 wherein the weight ratio is caused to be about 0.22.

13. The process as claimed in claim 1 including the step of combining the water that has been used to wash the sludge and the hydrochloric acid leaching solution that has been used to contact the washed sludge with the flow of geothermal brine from which the sludge was precipitated for disposal together.

14. The process as claimed in claim 13 including the step of combining the used wash water and acid leaching solution with the flow of geothermal brine for reinjection into the ground.

15. The process as claimed in claim 1 wherein the step of contacting the washed sludge with a hydrochloric acid solution includes agitating the mixture of acid solution and sludge.

16. A process for reducing the total concentration of heavy metal in silica sludge precipitated from a flow of hot, pressurized geothermal brine which is flashed to convert a portion of the brine to steam, the steam being condensed after use to water, the process comprising the steps of:
   (a) washing the silica sludge with water having a temperature of at least about 50° C. so as to replace with said water any brine which is entrapped in the sludge, buffering compounds in the brine being thereby washed from the sludge;
   (b) contacting the washed sludge with a hydrochloric acid solution having a hydrochloric acid-to-sludge weight ratio of between about 0.10 and about 0.25 at a temperature greater than about 80° C. for a time duration of longer than about one hour;
   (c) separating a silicious solids residue from the hydrochloric acid leaching solution; and
   (d) washing the silicious solids residue from the flush the hydrochloric acid leaching solution from said residue.

17. The process as claimed in claim 16 wherein the step of washing the residue with water comprises using said steam condensate as the wash water and wherein the step of washing the sludge comprises using the steam condensate wash water from the solid residue washing step.

18. The process as claimed in claim 17 including the step of combining the used sludge wash water and the used hydrochloric acid solution with the flashed brine for reinjection into the ground.

19. The process as claimed in claim 16 wherein the acid-to-sludge weight ratio is greater than about 0.22, wherein the temperature is between about 90° C. and about 95° C. and wherein the time duration is about four hours.

20. The process as claimed in claims 1 or 16 wherein the contacting step includes the addition of sodium chloride to the hydrochloric acid solution so as to enhance the solubility of lead in the sludge.

21. The process as claimed in claim 20, wherein the amount of sodium chloride added is between about 5 and about 20 weight percent.

22. The process as claimed in claim 16 wherein the weight percentage of hydrochloric acid in the leaching solution is at least about 2.2.

23. The process as claimed in claim 22 wherein the weight percentage of hydrochloric acid is between about 2.2 and about 8.6 percent.

24. In a geothermal brine handling facility in which high temperature, naturally pressurized, silica-rich geothermal brine is flashed to convert some of the brine to steam, the steam subsequently being used and at least some of the steam being condensed to steam condensate; and in which the flashed brine is contacted with silica seed material whereby silica precipitate is formed, said precipitate being separated from the brine in the form of silica sludge, a process for reducing the total concentration of heavy metals in the sludge, said process comprising the steps of:
   (a) washing the silica sludge with an amount of water having a temperature of at least about 50° C. to replace geothermal brine entrapped in the sludge;
   (b) separating the sludge from the wash water;
   (c) contacting the sludge with a hydrochloric acid solution having a hydrochloric acid-to-sludge weight ratio of at least about 0.1, a hydrochloric acid weight concentration of at least about 2 percent, for a time duration of at least about 1 hour and at a temperature of at least about 80° C.;
   (d) separating the silicious solids residue from the hydraulic acid leaching solution; and
   (e) washing the silicious solids residue with said steam condensate to flush the hydrochloric acid leaching solution from said residue.

25. The process as claimed in claim 24 including the step of washing the sludge includes using the steam condensate used to wash the solids residue as the wash water.

26. The process as claimed in claim 25 including the step of combining the wash water used to wash the sludge and used hydrochloric acid leaching solution with the geothermal brine for disposal therewith by reinjection into the ground.

27. A process for reducing in silica sludge precipitated from a flow of geothermal brine, the total concentration of heavy metals selected from the group consisting of lead, zinc, copper, cadmium and iron, the process comprising:
   (a) washing the silica sludge with hot water so as to replace with said water geothermal brine which is entrapped in said sludge;
   (b) contacting the washed sludge with a hydrochloric acid solution having a weight ratio of hydrochloric acid relatidve to said washed sludge causing the pH of the acid-sludge mixture to be less than about 1;
   (c) separating a silicious solids residue from the hydrochloric acid solution, and
   (d) washing the silicious solids residue with water to flush hydrochloric acid solution from said residue.

28. The process as claimed in claim 27 wherein the washed sludge is contacted with hydrochloric acid solution for between about one hour and about four hours.

29. The process as claimed in claim 27 wherein the step of washing the silica sludge with hot water comprises washing the sludge with water having a temperature of at least about 50° C. and includes using the wash water from the solids residue washing step.

30. The process as claimed in claim 27 in which the flow of geothermal brine has a wellhead temperature of at least about 400° F. and a wellhead pressure of at least about 400 psig, the brine flow being flashed to a lower pressure to convert some of the brine to steam, the steam being subsequently used and condensed to water, wherein both the steps of washing the sludge or residue with water comprises washing the sludge or silicious residue with said condensed steam.

31. The process as claimed in claim 27 wherein the contacting temperature is between about 90° C. and about 95° C.

32. The process as claimed in claim 27 wherein the concentration of hydrochloric acid in the leaching solution is between about 2 and about 9 weight percent.

33. The process as claimed in claim 32 wherein the concentration of hydrochloric acid in the leaching solution is between about 3.3 and about 6 weight percent.

34. The process as claimed in claim 27 wherein the step of contacting the washed sludge with a hydrochloric acid solution includes adjusting the amount of hydrochloric acid used so as to cause the weight ratio of hydrochloric acid-to-sludge to be between about 0.10 and about 0.33.

35. The process as claimed in claim 27 including the step of combining the water that has been used to wash the sludge and the hydrochloric acid leaching solution that has been used to contact the washed sludge with the flow of geothermal brine from which the sludge was precipitated for disposal together.

36. The process as claimed in claim 27 wherein the step of contacting the washed sludge with a hydrochloric acid solution includes agitating the mixture of acid solution and sludge.

37. A process for reducing the total concentration of heavy metals, selected from the group consisting of lead, zinc, copper, cadmium and iron, in silica sludge precipitated from a flow of hot, pressurized geothermal brine which is flashed to convert a portion of the brine to steam, the steam being condensed after use to water, the process comprising the steps of:
   (a) washing the silica sludge with water having a temperature of at least about 50° C. so as to replace with said water any brine which is entrapped in the sludge, buffering compounds in the brine being thereby washed from the sludge;
   (b) contacting the washed sludge with a hydrochloric acid solution having a hydrochloric acid-to-sludge weight ratio of between about 0.10 and about 0.25 at a temperature greater than about 80° C. for a time duration of longer than about one hour;
   (c) separating silicious solids residue from the hydrochloric acid leaching solution; and (d) washing the silicious solids residue with water to flush the hydrochloric acid leaching solution from said residue.

38. The process as claimed in claims 1, 16, 24, 27 or 37 wherein the geothermal brine contains iron and silica ions and the step of washing the silica sludge with water so as to replace with said water geothermal brine entrapped in the sludge includes washing the iron and silica ions contained in the brine out of the sludge.

39. The process as claimed in claim 38 wherein the geothermal brine contains chloride ions and including, after washing the silica sludge with water, the step of contacting a sample of the wash water with a silver nitrate solution to determine whether chloride ions are present in the water, and, if chloride ions are found to be present in the wash water, including the step of continuing to wash the silica sludge with water and continuing to contact samples of the wash water with the silver nitrate solution until it is determined that substantially no chloride ions are present in the wash water.

40. The process as claimed in claims 1, 16, 24, 27 or 37 wherein the geothermal brine contains chloride ions and including, after washing the silica sludge with water, the step of contacting a sample of the wash water with a silver nitrate solution to determine whether chloride ions are present in the water, and, if chloride ions are found to be present in the wash water, including the step of continuing to wash the silica sludge with water and continuing to contact samples of the wash water with the silver nitrate solution until it is determined that substantially no chloride ions are present in the wash water.

* * * * *